March 8, 1927.
J. WEECH
SIGNALING APPARATUS FOR AUTOMOBILES
Filed Aug. 13, 1923
1,620,049
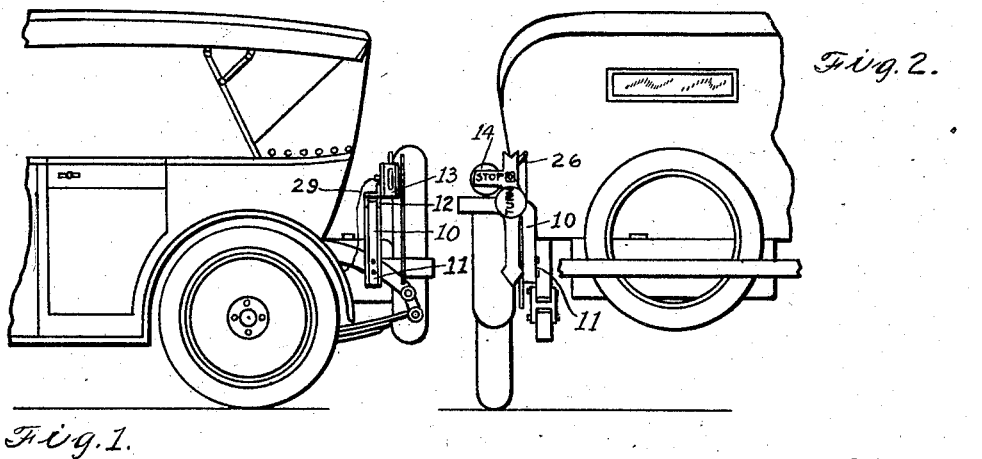
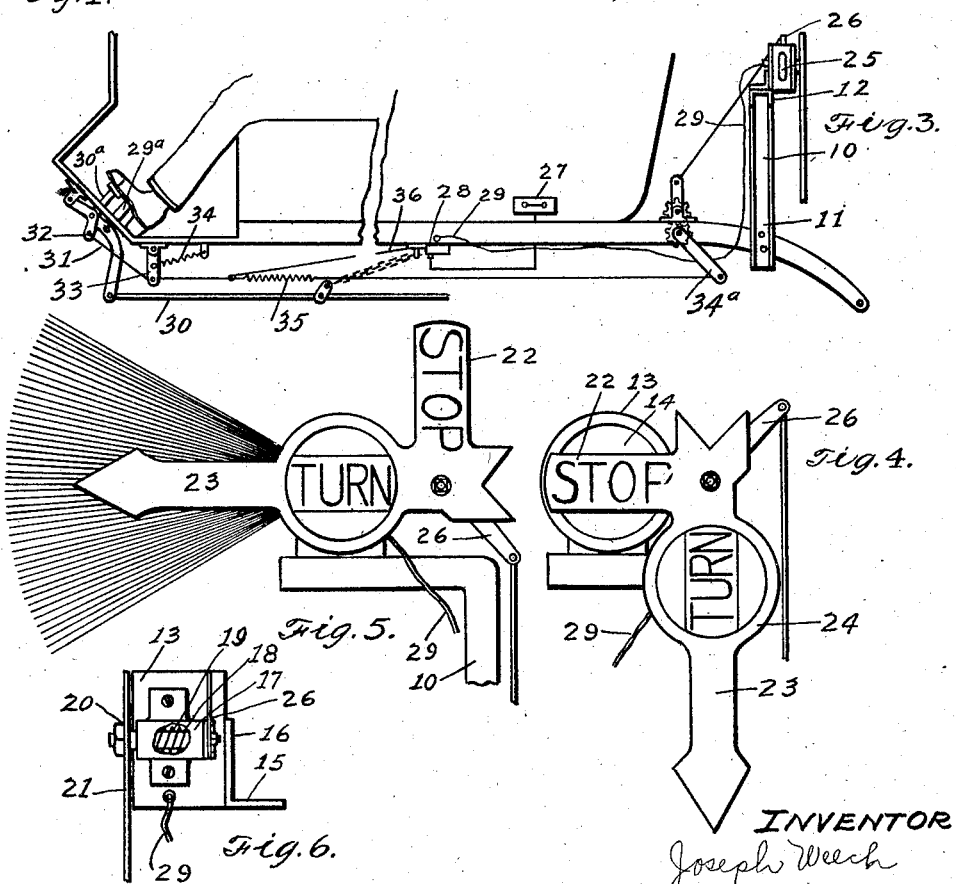
INVENTOR
Joseph Weech
BY Jeff & Jeff
ATTY'S.

Patented Mar. 8, 1927.

1,620,049

UNITED STATES PATENT OFFICE.

JOSEPH WEECH, OF GALESBURG, ILLINOIS.

SIGNALING APPARATUS FOR AUTOMOBILES.

Application filed August 13, 1923. Serial No. 657,115.

My invention relates to signal apparatus for automobiles.

The object of my invention is in the provision of a signal light adapted to be placed on the rear of an auto to indicate either the stopping of said vehicle or the turning thereof.

Another object of my invention is in the provision of a stop and turn light of simple construction whereby the driver is capable of indicating alternately either the stopping of his car or a turn.

A further object of my invention is in the particular details of structure wherein a single light member is used in conjunction with stop and turn lights whereby the movement of the vehicle may be indicated as desired.

Other objects of my invention will appear in the following specification taken in connection with the annexed drawings, in which:

Figure 1 is a partial side elevation of a motor vehicle having my signaling device mounted thereon.

Figure 2 is a rear elevation of my signaling device mounted on a motor car.

Figure 3 is an enlarged detail showing my particular mechanical means for operating my signaling device and an electrical connection therefor.

Figures 4 and 5 are enlarged elevations of my signaling device showing the respective signaling portions, "Stop" and "Turn" in their relative operative positions.

Figure 6 is a detail showing the means for tensioning the turn indicating arrow.

Referring to the drawing:—

At 10 I have shown a bracket engaging a portion of the frame as at 11. The upper portion 12 of the bracket is adapted to receive and support the signaling device. Although I have indicated my signaling device as supported from the frame, I do not wish to be limited to such structure, inasmuch as my device is equally adapted to be mounted upon the rear fender, the only change being in the shape and size of the supporting bracket. For the purpose of more clearly illustrating my device, I have chosen the mounting upon the frame. A portion of my structure is somewhat similar to the conventional stop light and operates in exactly the same manner: i. e., a cylindrical metal lamp casing 13 is attached to the arm 12 and has mounted therein in a formal manner, an electric bulb (not shown). A plate glass 14, usually red, covers the rearwardly projecting portion of the light member thru which the rays from the lamp are adapted to be thrown. A small bracket 15 is attached at 16 to one side of the lamp casing and fashioned in connection with said bracket is a tubular portion 17 containing therein a rod 18 spring tensioned with relation to the cylinder member by the coil spring 19. Positively attached to one end of the rod 18 as at 20, is the signaling arrow 21. This signaling arow generally designated as 21 is literally both a stop and turn signaling member inasmuch as a projecting portion 22 has the word "Stop" thereon in such manner that when it is projecting across the face of the lamp said word will be illuminated to warn the following vehicle that the forward vehicle is slowing down for a stop. The projecting portion 22 containing the word "Stop" thereon is substantially rectangular in shape, although the outer end thereof is adapted to conform to the shape of the lamp so as to form a neat appearing device. The turn portion comprises the extended arrow member 23 which has a circular intermediate portion 24 wherein there is cut out the word "Turn" in such manner that when the arrow is pivoted and the circular portion completely covering the lamp member, the rays therefrom will project thru the word "Turn" to warn the following vehicle that a turn is about to be made. Also, upon one side of the lamp casing there is a cut out portion 25 as shown in Figure 3 thru which the light rays may project and it may be readily seen that when the turn signal is used the rays from said portion will illuminate the outer end of the arrow as shown in Figure 4 of the drawings. A crank arm 26 has a positive engagement with the opposite end of the rod 18 and said crank arm is operated by the lever mechanism now to be described.

In Figure 3 of the drawings there is shown a battery 27 of formal construction which has electrical connection with a switch 28, which is also connected by the wire 29 to the electric bulb in the lamp portion of the signaling device. The switch 28 is of formal construction and is of the spring type, i. e., when a plunger is withdrawn a contact will be made to light the electric bulb in the lamp portion. This operation of the switch and globe is conventional for all stop lights.

Normally it may be said and due to the tensioning of the arrow thru the spring 19 and rod 18, the stop portion projects across the lamp with the result that when the driver desires to slow down, which he would necessarily have to do before making a curve, he merely presses in the clutch or brake 29ª with the result that longitudinal movement of the rod 30 of formal automobile construction, withdraws the plunger in the switch 28 with the result that the lamp portion will be lighted with a consequent illumination of the stop signal.

The above operation as stated before, is that merely of the ordinary stop light. My device includes along with this formal stop light mechanism, a separate pivoted lever mechanism 30ª projecting thru the floor boards and adapted to be operated by the driver's foot, said pivoted lever 30ª having a wire or cable 31 attached as at 32 thereto and said wire engaging a spring tensioned post 33 attached to the lower part of one of the floor boards. The spring 34 provides means for returning the lever to its normal position when the foot of the operator is raised therefrom. The wire or cable 31 extends from the post 33 to another series of levers generally designated at 34ª which have a geared connection which permits downward movement of the crank thru another wire or cable member when the foot lever is pressed downwardly by the operator. A coil spring connection 35 in the cable 31 is shown, as well as a connection 36 to the plunger of the formal switch member.

Operation of the above mechanism is as follows:

As explained before, when the operator desires to slow down he merely presses the clutch or brake which results in an illumination of the stop signal. However, should he desire to make a turn, he merely presses down on the lever 30ª whereupon thru the cable and lever connections, the crank arm is moved downwardly with a consequent raising of the arrow to a horizontal position with the turn signal thereon, covering the lamp portion. The lamp has been illuminated, due to the forward movement of the cable which withdraws the plunger in the switch member causing a circuit to be made with the battery and lighting of the electric globe in the lamp, as shown in Figure 3. When the arrow is thrown to the turn position, not only will the turn signal be illuminated to warn the following vehicle, but also the light on the side of the lamp will illuminate the outer end of the arrow for additional warning.

In a similar manner, after the turn has been made, the withdrawal of the lever 30, due to the action of the coil spring 34, causes the spring tensioned crank arm to return to its normal position causing the arrow to be projected downwardly and the stop portion thereon to again coincide with the face of the lamp. The coil spring 35 forming a connection in the cable 31 is attached merely as a safety or buffer means to prevent breakage of the cable upon violent downward movement of the lever 30ª by the operator.

What I claim is:

In a signaling device a lamp portion including a normally deenergized source of light, a housing therefor, and an opening at the rear of said housing through which light may pass, an indicating member comprising two sets of indicia, one indicating "stop" and the other "turn", means for mounting said indicating member on said lamp for movement from a normal position with the "stop" indicia in front of said opening, to a position with said "turn" indicia in front of said opening, and means for controlling said signal comprising means for illuminating said light to give a "stop" signal and for moving said indicating members from one position to the other and simultaneously energizing the light to give a "turn" signal.

In testimony whereof, I affix my signature.

JOSEPH WEECH.